United States Patent
Shomo et al.

(10) Patent No.: US 11,500,847 B2
(45) Date of Patent: Nov. 15, 2022

(54) SYSTEM AND METHOD FOR REAL-TIME FORENSIC INSTRUMENTATION

(71) Applicant: Open Text Holdings, Inc., San Mateo, CA (US)

(72) Inventors: Paul M. Shomo, North Bend, WA (US); Robert Batzloff, Danville, CA (US)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 117 days.

(21) Appl. No.: 16/583,055

(22) Filed: Sep. 25, 2019

(65) Prior Publication Data

US 2021/0089510 A1      Mar. 25, 2021

(51) Int. Cl.
| | |
|---|---|
| *G06F 16/23* | (2019.01) |
| *G06F 16/22* | (2019.01) |
| *G06F 16/2457* | (2019.01) |
| *G06F 16/25* | (2019.01) |

(52) U.S. Cl.
CPC ...... *G06F 16/2358* (2019.01); *G06F 16/2228* (2019.01); *G06F 16/2365* (2019.01); *G06F 16/24575* (2019.01); *G06F 16/252* (2019.01)

(58) Field of Classification Search
None
See application file for complete search history.

(56) References Cited

U.S. PATENT DOCUMENTS

| | | | | |
|---|---|---|---|---|
| 2011/0276770 | A1* | 11/2011 | Zhu | G06F 9/44505 |
| | | | | 711/160 |
| 2012/0191660 | A1* | 7/2012 | Hoog | G06F 21/552 |
| | | | | 707/661 |
| 2017/0244754 | A1* | 8/2017 | Kinder | H04L 63/1466 |
| 2020/0137085 | A1* | 4/2020 | Kostyushko | G06F 21/53 |
| 2020/0327225 | A1* | 10/2020 | Nguyen | G06F 21/554 |
| 2020/0351293 | A1* | 11/2020 | Ponnuru | H04L 63/20 |

(Continued)

OTHER PUBLICATIONS

Duranec et al. "Investigating file use and knowledge with Windows 10 artifacts". 2019 42nd Int'l Convention on MIPRO. DOI: 10.23919/MIPRO.2019.8756877. Published on IEEE on Jul. 11, 2019. URL Link: <https://ieeexplore.ieee.org/document/8756877>. Accessed Jun. 2022. (Year: 2019).*

(Continued)

*Primary Examiner* — Irene Baker
(74) *Attorney, Agent, or Firm* — Sprinkle IP Law Group (57) ABSTRACT

Real-time forensic instrumentation comprising: a monitoring hook into the notification interface of an operating system; a forensic artifact filter to evaluate events received via the real-time monitoring hook to determine if an event represents a change to a forensic artifact; and a forensic interpreter subsystem to: based on the forensic artifact filter output, collect forensic metadata associated with the forensic artifact and apply a forensic analysis to the forensic artifact to generate a result; generate a forensically interpreted activity for the event, the forensically interpreted activity comprising the forensic metadata, the result of the forensic analysis and a description of a first activity by a user with respect to the forensic artifact; and store the forensically interpreted activity in a digital forensics store.

23 Claims, 5 Drawing Sheets

(56) References Cited

U.S. PATENT DOCUMENTS

2021/0012000 A1* 1/2021 Halcrow ................. G06F 21/53
2021/0042262 A1* 2/2021 Nair ..................... G06F 21/602

OTHER PUBLICATIONS

Soltani et al. "A survey on digital evidence collection and analysis". 2017 7th Int'l Conference on Computer and Knowledge Engineering (ICCKE). DOI: 10.1109/ICCKE.2017.8167885. Published on IEEE on Dec. 7, 2017. URL Link: <https://ieeexplore.ieee.org/document/8167885>. Accessed Jun. 2022. (Year: 2017).*

* cited by examiner

SYSTEM AND METHOD FOR REAL-TIME FORENSIC INSTRUMENTATION

TECHNICAL FIELD

This disclosure relates to computer investigation systems, and more specifically to computer forensic investigations. Even more particularly, embodiments relate to systems and methods for real-time forensic instrumentation.

BACKGROUND

Computer investigation has become increasingly important as the use of computers has extended to virtually all areas of everyday life. Computer investigation includes computer forensics, which is the collection, preservation and analysis of computer-related evidence, typically for possible use as evidence in a legal proceeding. The field of computer forensics maintains established practices for the collection, preservation, and analysis of data stored on computer systems. These practices are rooted in legal requirements and decades of court precedence. The application of these practices when conducting an investigation on a target computer has historically required considerable time and effort from an experienced investigator.

Computer forensics typically involves the systematic inspection of a computer system and the collection, preservation and analysis of "forensic artifacts" found on the computer system. Forensic artifacts include items, objects or areas that hold information of forensic interest, particularly information relevant to the activities performed on a computer. Forensic artifacts can include evidentiary residue that operating systems leave behind incidentally based on actions of users and applications. Examples of forensic artifacts include, but are not limited to: undocumented system files; meta-storage such as a Windows® registry and MacOS® plists (Windows is registered trademark of Microsoft Corporation, MacOS is a registered trademark of Apple, Inc., all trademarks, service marks, certification marks, or collective marks used herein are property of their respective owners); kernel data structures in memory; data stored in file system metadata and headers; and log files. The computer forensics community continually identifies, reverse-engineers and publishes previously undocumented forensic artifacts.

As will be appreciated, there may be multiple forensic artifacts of various types and locations in an operating system environment. By way of example, but not limitation, an operating system environment may include USBSTOR registry keys related to USB activity, ShellBags that track views, sizes and positions of a folder window, log files and registry keys that relate to authentication activity, cache folders for opened email attachments, .lnk files for open files, files related to run command activities, process memory that relates to run command activities, and other forensic artifacts. Forensic investigators may analyze such forensic artifacts to determine USB activity, folder browsing activity, authentication activity, clicking on attachments activity, clicking on files activity, website browsing activity, run command activity and other activities that occurred on a target computer.

Computer forensics systems focus on point-in-time batch processing of all forensic artifacts on a target computer. Forensically sound collection of forensic artifacts typically involves an I/O intensive process of reading data in memory in a large batch, without modifying the data. The collected data is analyzed to identify forensic artifacts. Computer forensics systems favor interpreting file system metadata, rather than trusting the operating system, to locate the artifacts. The parsing and interpretation of forensic artifacts to determine conclusionary forensic metadata and the storage of the conclusionary forensic metadata is performed at the end of a long batch processing job, run at a specific points-in-time.

The reliance of computer forensic systems on batch collection and processing of forensic artifacts has limitations. As one such shortcoming, batch collection suffers from an artifact overwrite problem. A point-in-time batch collection of artifacts collects artifacts as they are at the time the batch is collected but may miss states of the artifacts that have been overwritten prior to the batch being collected. Furthermore, a number of forensic artifacts are temporal in-memory artifacts that batch collection will fail to collect if they are not in-memory when the batch is created. Batch collection also results in a high I/O load, slowing the target computer.

SUMMARY

Attention is thus directed to the real-time forensic instrumentation systems and methods disclosed herein.

One embodiment includes a computer program product comprising a non-transitory computer-readable medium storing a set of computer-readable instructions. The computer-readable instructions are executable to use a monitoring hook into the notification interface of the operating system to receive an event. The computer-readable instructions are further executable to provide a forensic artifact filter coupled to the monitoring hook, the forensic artifact filter comprising code executable to: for the event received using the monitoring hook, evaluate the event according to a forensic artifact definition to determine if the event represents a change to a forensic artifact; and based on a determination that the event represents the change to the forensic artifact, output a forensic artifact filter output that includes event information for the event, the event information including an indication of the forensic artifact. The computer-readable instructions are further executable to: based on the forensic artifact filter output, collect forensic metadata associated with the forensic artifact and apply a forensic analysis to the forensic artifact to generate a result, the forensic metadata including a user identifier for a user of the operating system; generate a forensically interpreted activity for the event, the forensically interpreted activity comprising the forensic metadata, the result of the forensic analysis and a description of a first activity by the user with respect to the forensic artifact; and store the forensically interpreted activity in a digital forensics store for the computer.

Another embodiment includes a method for real-time digital forensic instrumentation, the method comprising: on a computer comprising a processor and an operating system with a notification interface, using a monitoring hook into the notification interface of the operating system to receive an event; the processor applying a forensic artifact filter to the event; based on a forensic artifact filter output, the processor collecting forensic metadata associated with a forensic artifact and applying a forensic analysis to the forensic artifact to generate a result, the forensic metadata including a user identifier for a user of the computer; the processor generating a forensically interpreted activity for the event, the forensically interpreted activity comprising the forensic metadata, the result of the forensic analysis and a description of a first activity by the user with respect to the forensic artifact; and the processor storing the forensically interpreted activity in a digital forensics store for the computer. According to one embodiment, applying the forensic artifact filter comprises: evaluating an event according to a forensic artifact definition to determine if event represents a change to the forensic artifact; and based on a determination that the event represents the change to the forensic artifact, generating the forensic artifact filter output that includes event information for the event, the event information including an indication of the forensic artifact.

Another embodiment includes a system comprising: a processor and a computer-readable medium storing an operating system having a notification interface and a set of computer-readable instructions, the set of computer-readable instructions executable to configure the processor with real-time forensic instrumentation. According to one embodiment, the real-time forensic instrumentation comprises: a monitoring hook into the notification interface of the operating system to receive an event; a forensic artifact filter coupled to the monitoring hook; and a forensic interpreter subsystem coupled to the forensic artifact filter. According to one embodiment, the forensic artifact filter comprises code executable to: for an event received using the monitoring hook, evaluate the event according to a forensic artifact definition to determine if the event represents a change to a forensic artifact; and based on a determination that the event represents the change to the forensic artifact, generate a forensic artifact filter output that includes event information for the event, the event information including an indication of the forensic artifact. According to one embodiment, the forensic interpreter subsystem comprises code executable to: based on the forensic artifact filter output, collect forensic metadata associated with the forensic artifact and apply a forensic analysis to the forensic artifact to generate a result, the forensic metadata including a user identifier for a user of the operating system; generate a forensically interpreted activity for the event, the forensically interpreted activity comprising the forensic metadata, the result of the forensic analysis and a description of a first activity by the user with respect to the forensic artifact; and store the forensically interpreted activity in a digital forensics store.

Embodiments described herein provide advantages over prior computer forensics systems. As one advantage, embodiments of real-time forensic instrumentation can record each granular artifact changes as they occur, thus reducing or eliminating the artifact overwrite problem. Furthermore, embodiments provide an advantage by providing a mechanism that can collect temporal forensic artifacts.

As another advantage, embodiments of real-time forensic instrumentation provide incremental forensic artifact collection that is highly scalable. Since each forensic artifact is typically quite small, interpreting them in the volatile memory of a target computer system as they are changed, is faster than connecting to the target computer and batch processing all of the artifacts together. As few resources are needed at a given time to interpret a forensic artifact, each target computer or other endpoint can investigate itself in real-time.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide real-time forensic instrumentation and methods for collecting and interpreting forensic artifacts. According to one embodiment, the real-time forensic instrumentation continually monitors a target computer system to capture live forensic artifact changes by operating system services. Based on detecting a change to a forensic artifact (e.g., creation or update of a forensic artifact), the real-time forensic instrumentation can parse and interpret the artifact to generate a forensically interpreted activity, which can be represented as a small amount of metadata. In some embodiments, artifacts may be small enough to load into volatile memory to provide interpretation real-time.

Figure 1:
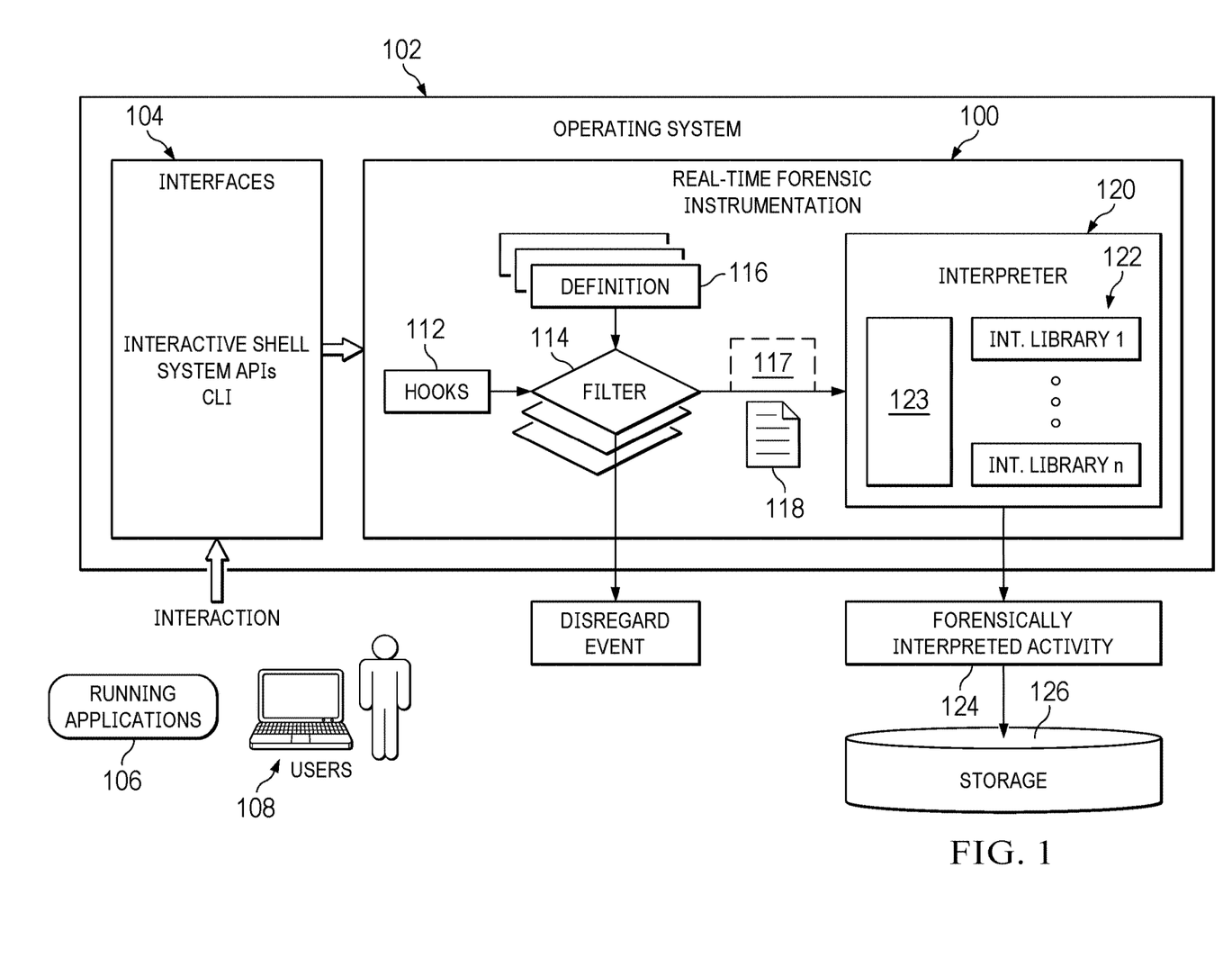
FIG. 1 is a diagrammatic representation of one embodiment of real-time forensic instrumentation on a target computer.

FIG. 1 is a diagrammatic representation of one embodiment of real-time forensic instrumentation 100 installed on a target computer running an operating system 102. In the embodiment illustrated, real-time forensic instrumentation 100 comprises monitoring hooks 112, forensic artifact filters 114 coupled to monitoring hooks 112 and a real-time forensic interpreter 120 coupled to forensic artifact filters 114.

Operating system 102 provides a number of interfaces 104 through which applications 106 or users 108 may interact. For example, operating system 102 may provide system APIs through which applications can read/write/ execute/delete binaries, data files, or other data, make network connections or take other actions. Operating system 102 may also have an interactive shell (e.g., a graphical shell) through which users 108 can navigate a file system, opening folders and files. As another example, the operating system 102 may include a command line interface (CLI) through which a user can run commands. Operating system 102 further includes an event notification interface, such as event notification API, that allows applications to register to receive events. For example, operating system 102 can include an event notification API that allows an application to set hooks into the notification interface.

As will be appreciated, there may be multiple forensic artifacts of various types and locations in the operating system environment. By way of example, but not limitation, an operating system environment may include USBSTOR registry keys related to USB activity, ShellBags that track views, sizes and positions of a folder window, log files and registry keys that relate to authentication activity, cache folders for opened email attachments, .lnk files for open files, files related to run command activities, process memory that relates to run command activities, and other forensic artifacts.

Real-time forensic instrumentation 100 continually monitors granular behavior of operating system 102 by registering with the notification interface to receive events that may be indicative of changes to forensic artifacts. According to one embodiment, real-time forensic instrumentation 100 receives events using monitoring hooks 112, which may be set by registering callbacks with operating system APIs that provide operating system events for granular behaviors of running processes or OS services. As there may be multiple forensic artifacts of various types and locations in the operating system environment, real-time forensic instrumentation 100 can register to receive various types of events. Monitoring hooks 112 may thus include hooks of various types.

As will be appreciated, real-time forensics instrumentation 100 may receive a large quantity of granular OS events as registry key changes, file changes, or running process changes occur. Only a small portion of these events will relate to operating system 102 changing (e.g., creating or updating) forensic artifacts. To this end, real-time forensic instrumentation 100 includes forensic artifact filters 114 operatively coupled to monitoring hooks 112 to identify events that represent changes to forensic artifacts. According to one embodiment, forensic artifact filters 114 are implemented as callback routines that are called when an event is received using the respective monitoring hook 112. In some embodiments, a forensic artifact filter 114 is implemented as a filter driver (e.g., a kernel-mode driver).

Each forensic artifact filter 114 is executable to evaluate events according to a respective forensic artifact definition 116 to determine if an event represents a change to a forensic artifact. In general, a forensic artifact will have known characteristics, such as registry location, registry key name, directory location, file name, file extension, etc. As such, a forensic artifact definition 116 can include information usable to identify an event representing a change to a forensic artifact. A forensic artifact filter 114 parses a received event and evaluates the event according to the forensic artifact definition 116 to determine if the event represents a change to a forensic artifact.

If the received event does not represent a change to a forensic artifact, forensic artifact filter 114 disregards the event. For example, in a filter driver implementation, forensic artifact filter 114 can allow the event to proceed through the driver stack. If forensic artifact filter 114 determines that an event represents a change to a forensic artifact, forensic artifact filter 114 outputs a forensic artifact filter output 117 that includes event information for the event, including an indication of the forensic artifact 118 changed by the event. For example, forensic artifact filter 114 may hand off event information (e.g., the type of event and the registry key name, system file full path, or other information that identifies the forensic artifact to which the event is related) to forensic interpreter 120. According to one embodiment, forensic artifact filter 114 does not block the event (e.g., from proceeding through a driver stack), even if it determines that an event represents a change to the forensic artifact. As such, forensic interpreter 120 may be considered an out-of-band interpreter.

A forensic interpreter 120, which may comprise a subsystem of code for handling real-time events, is coupled to one or more forensic artifact filters 114. In the illustrated embodiment, forensic interpreter 120 includes various code libraries 122 for interpreting various types of forensic artifacts.

For example, forensic interpreter 120 may include a code library to analyze USBStor registry entries to determine USB activity, a code library to analyze ShellBags to determine a browse folder activity, a code library to analyze registry keys or log files to determine an authenticate activity, a code library to analyze a cache folder to determine a click attachment activity, a code library to analyze .lnk files to determine click file activity, a code library to analyze a ConsoleHost_history.txt file or process memory to determine a run command activity, and/or other code libraries to interpret other types of forensic artifacts. Various techniques known or developed in the art for analyzing various forensic artifacts to extract forensically interesting data may be employed. Forensic interpreter 120 further includes code 123 executable to map the event information to a selected code library 122.

Based on the forensic artifact filter output 117, forensic interpreter 120 reads the forensic artifact 118 into memory, selects the appropriate code library 122 and passes forensic artifact 118 to the selected code library for analysis. The selected code library 122 analyzes the forensic artifact (and potentially additional artifacts) according to forensically sound practices to determine an analysis result that indicates an activity that was carried out. The selected code library can be executable to collect additional forensic metadata, such as forensic metadata not determined from the forensic artifact. For example, the forensic metadata may include the username associated with a current user of the target computer.

In some embodiments, a code library includes a template activity description into which the collected forensic metadata and results of the forensic analysis can be inserted to generate a forensically interpreted activity 124, which may include a human-understandable description of a user activity on the target computer. According to one embodiment, a forensically interpreted activity specifies an activity, an identifier of the user who carried out the activity and the time that the activity was carried out. Forensically interpreted activity 124 is stored in a digital forensics data store 126, which may be a local data store at the target computer or a remote data store. In some embodiments, forensically interpreted activity 124 is stored locally to cache before sending it to a server. In other embodiments, the forensically interpreted activity can be streamed to a server in real-time.

To provide an example, real-time forensic instrumentation 100 may be used to collect forensically sound data with respect to user folder browsing activity in a Windows® based system that uses ShellBag registry keys at the registry path: HKEY_LOCAL_MACHINE\Software\Microsoft\Windows NT\CurrentVersion\ProfileList to store GUI folder display information. In this example, a monitoring hook 112 can be implemented by using CmRegisterCall( ) or CmRegisterCallbackEx( ) to register a RegistryCallback routine. The RegistryCallback routine can be executable to implement a forensic artifact filter 114 that parses events for a reference to HKEY_LOCAL_MACHINE\Software\Microsoft\Windows NT\CurrentVersion\ProfileList.

Real-time forensic instrumentation 100, in this example, will receive notifications about all the registry keys being changed (created, deleted, or updated). The forensic artifact filter 114 analyzes each registry change event to determine if the modified key is a ShellBag artifact by looking for the registry path HKEY_LOCAL_MACHINE\Software\Microsoft\Windows NT\CurrentVersion\ProfileList in the event.

If forensic artifact filter 114 determines that the modified artifact is a ShellBag artifact, forensic artifact filter 114 passes the event information to forensic interpreter 120. The forensic interpreter 120 maps the event information to the code library 122 for analyzing ShellBags and executes the selected code library 122 to parse the ShellBag artifact to determine the folder browsed, reconstruct the folder path using forensic best practices, replacing the "%" delimiter with a '\', and parse the time stamp of the ShellBag artifact to determine the date and time a folder browsing activity occurred. The forensic interpreter 120. According to one embodiment, the selected code library is further executable to collect additional forensic metadata, such as the username to which the registry section in which the ShellBag artifact appears correlates. The forensic interpreter uses the results of the forensic analysis of the forensic artifact and the additional collected forensic metadata to generate a forensically interpreted activity 124, such as: "User sally.jones clicked and browsed the folder c:\Windows on Jul. 1, 2019 10:23:03 AM." The forensically interpreted activity 124 is written to a digital forensics data store 126, such as a database.

As will be appreciated, operating system 102 also provides mechanisms to allow real-time forensic instrumentation 100 to register to receive file change notifications that can be used to monitor for changes to directories for forensically interesting files. For example, real-time forensic instrumentation 100 can register to receive file change events and a forensic artifact filter 114 can be configured to filter the file change events for file changes events involving .lnk files in a particular directory. Similarly, real-time forensic instrumentation can filter for file change events for files in directories known to contain forensically interesting artifacts, such as directories that hold email cache files. Real-time forensic instrumentation can further filter for file change events for specific files, such as ConsoleHost_history.txt. As will be appreciated, real-time forensic instrumentation can include filters 114 to recognize the creation, update or deletion of .lnk files, email cache files, the ConsoleHost_history.txt files or other forensically interesting files.

According to one embodiment, real-time forensic instrumentation 100 includes a file system filter driver, or a file system minifilter driver, that provides hooks into I/O operations (e.g., I/O request packet (IRP) based operations) and file system filter (FSFilter) callback operations. The driver is executable to register a pre-operation callback routine, a post-operation callback routine or both, where the callback routine(s) implement one or more forensic artifact filters 114.

In a more particular embodiment, a minifilter driver is provided where the minifilter driver includes a DriverEntry routine that performs global initialization, registers the driver (e.g., with FltRegisterFilter) and provides the OS's filter manager with a list of callback routines and other information about the driver. The minifilter driver sets a monitoring hook 112 by registering a callback routine for a particular type of I/O operation with the OS's filter manager. For example, the minifilter driver can register a callback routine for a system call such as, but not limited to FltGetFileNameInformation, with the filter manager. In one embodiment, the DriverEntry routine can be configured to register one more routines of type PFLT_PRE_OPERATION_CALLBACK and/or one or more routines of type PFLT_POST_OPERATION_CALLBACK with the filter manager of the OS. The minifilter driver calls FltStartFiltering (e.g., from its DriverEntry routine) to start filtering for the driver.

As the filter manager processes an event, the filter manager calls the registered callback routines for the type of operation. As will be appreciated, the filter manager of one embodiment calls minifilter pre-operation callback routines registered for the operation prior to the filter manager passing the operation to the file system and legacy filters that have registered completion routines for the operation and calls minifilter post-operation routines after these completion routines have finished.

In any case, when an event (e.g., an I/O operation) for which a callback routine has been registered is processed by the filter manager, the filter manager calls the callback routine (either pre-operation or post-operation). Thus, continuing with the prior example, when the filter manager processes a FltGetFileNameInformation operation, the filter manager calls the registered callback routine to execute a forensic artifact filter 114 on the operation. The forensic artifact filter 114 determines if the file being modified is an artifact with forensic value (e.g., based on directory path or file name) the forensic artifact filter 114 outputs a forensic artifact filter output 117 that includes event information for the event, including an indication of the file changed by the event.

Based on the forensic artifact filter output 117, forensic interpreter 120 reads the forensic artifact 118 into memory, selects the appropriate code library 122 and passes forensic artifact 118 to the selected code library for analysis. The code library 122 for a particular type of file system artifact (e.g., .lnk files, PowerShell ConsoleHost_history.txt, WINDOWS PreFetch files, or other file system artifact) is configured to account for the unique OS I/O behavior around that type of artifact and encapsulate design considerations accounting for the file system artifact being closed, or held open, and whether the forensic artifact updates part of the system file or overwrites it anew. In some cases, the code library 122 for a type of file system artifact can be executable to identify clear transaction boundaries indicating an event corresponding to user activity has just finished, and that metadata around this activity is now stored in the artifact. From either having already collected the information in transit from I/O operations, or by re-reading the file system artifact, the forensic interpreter 120 generates a forensically interpreted activity 124.

It should be understood that the examples of setting hooks for registry events and file events are provided by way of example, but not limitation, and embodiments can include hooks for any event types that may indicate a change to a forensic artifact. By way of example, but not limitation, forensic instrumentation can register to receive directory change notifications and process start/stop notifications and apply appropriate filters to the notifications.

Figure 2:
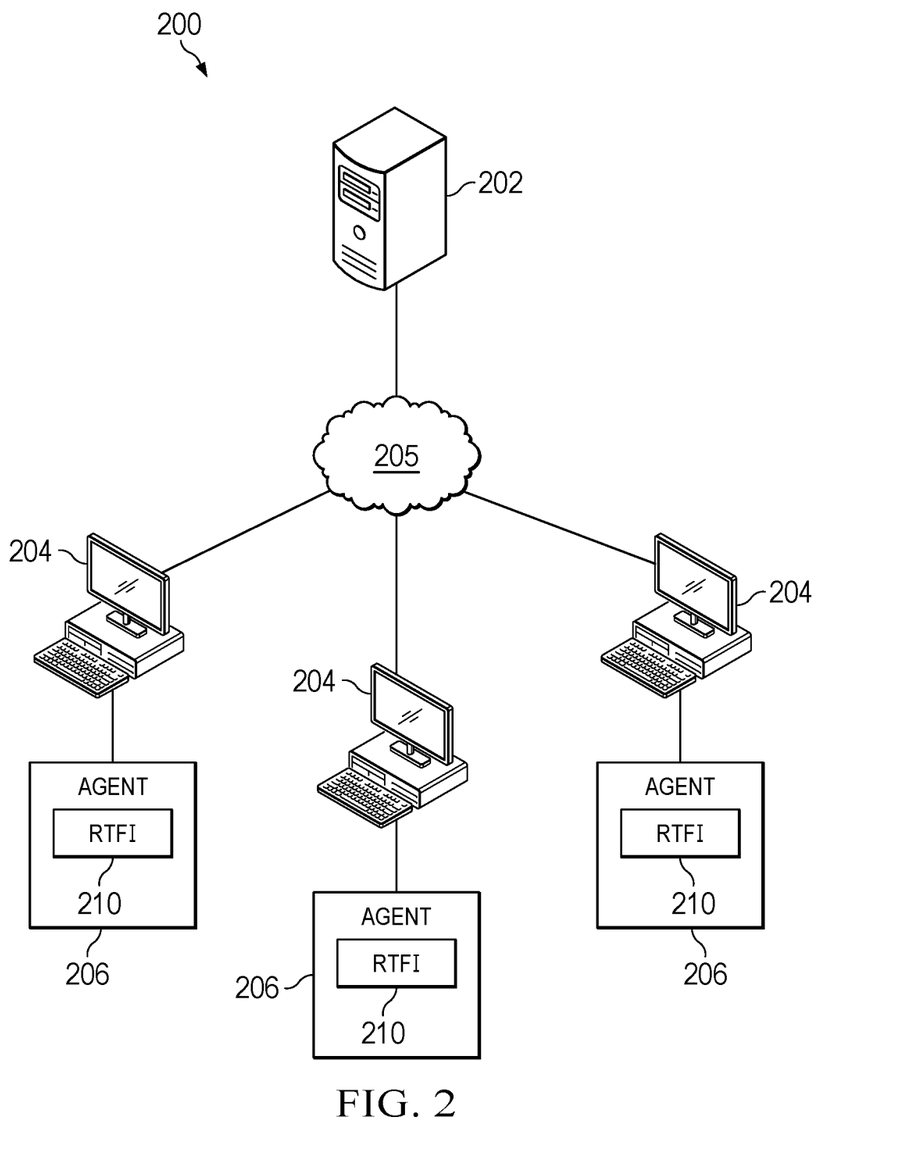
FIG. 2 is a diagrammatic representation of one embodiment of a network topology.

Real-time forensic instrumentation 100 may be implemented according to a variety of architectures. FIG. 2, for example, illustrates one embodiment of a network topology 200 comprising a server computer 202 coupled to a plurality of target computer systems 204 via a network 205. Network 205 may represent a combination of wired and wireless networks that a network computing environment may utilize for various types of network communications.

Each target computer system 204 may include a locally running forensic agent 206 to take snapshots (batch collection) of the respective target computer system and provide the snapshots to server computer 202 for forensic analysis. Each forensic agent 206 may further include real-time forensic instrumentation 210 to continually monitor the respective target computer system 204 and generate forensically interpreted activities. In some embodiments, the forensically interpreted activities are provided to server 202 as they are generated. In other embodiments, the forensically interpreted activities are provided to server computer 202 in batches.

Figure 3:
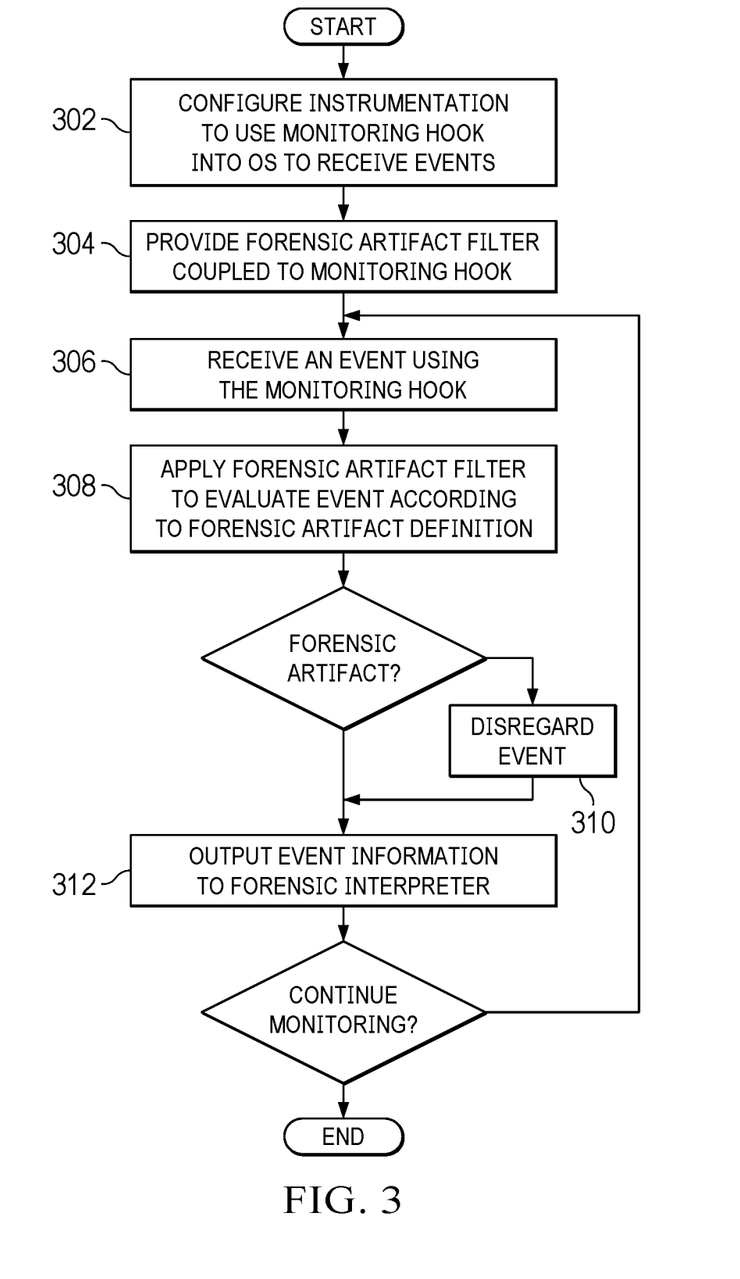
FIG. 3 is a flow chart of one embodiment of monitoring a target computer for events representing changes to forensic artifacts.

FIG. 3 is a flow chart illustrating one embodiment of a method of real-time forensic monitoring of an operating system. At step 302, real-time forensic instrumentation (e.g., real-time forensic instrumentation 100) is configured to use a monitoring hook into a notification interface of an operating system to receive events. A forensic artifact filter is provided for the monitoring hook (step 304). In some embodiments, a callback routine is registered for a monitoring hook where the callback routine includes the forensic artifact filter.

At step 306, the real-time forensic instrumentation receives an event using the monitoring hook. At step 308, the real-time forensic instrumentation executes the forensic artifact filter on the event to evaluate the event according to a forensic artifact definition. The forensic artifact definition may specify characteristics of a forensic artifact, such as registry key name, file name, registry location, directory location, or other information usable to identify an event as representing a change to a forensic artifact.

If the forensic artifact filter determines that the event does not represent the change to the forensic artifact, the forensic artifact filter disregards the event (step 310). If the forensic artifact filter determines that the event represents a change to a forensic artifact, the forensic artifact filter outputs a forensic artifact filter output that includes event information for the event (step 312). The event information includes an indication of the forensic artifact, such as a registry location of the forensic artifact, directory location of the forensic artifact, memory location of the forensic artifact, name of the forensic artifact or other information to allow a forensic interpreter to access the forensic artifact.

FIG. 3 is provided by way of example and not limitation. Various steps may be repeated. For example, steps 302 and 304 may be repeated for each monitoring hook used and 306-308 may be repeated for a monitoring hook until monitoring using that hook is terminated. Steps may be performed in different orders, steps omitted, and additional or alternative steps performed.

Figure 4:
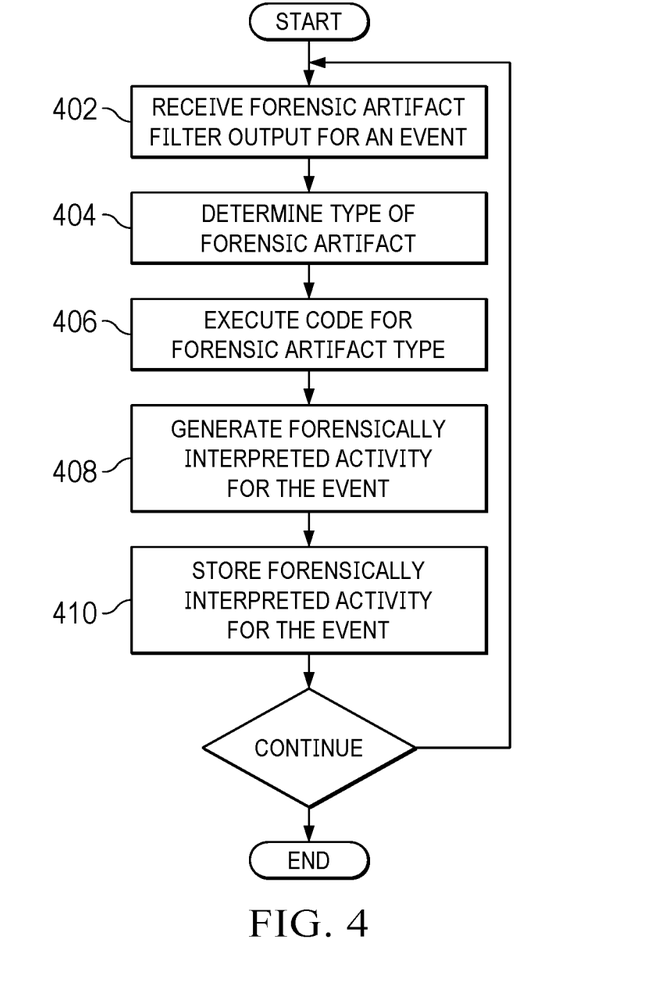
FIG. 4 is a flow chart of one embodiment of a method for forensic interpretation.

FIG. 4 is a flow chart illustrating one embodiment of a method of real-time forensic interpretation. At step 402, a real-time forensic interpreter (e.g., forensic interpreter 120) receives a forensic artifact filter output. The forensic artifact filter output may include an indication of a forensic artifact changed by an event, such as a registry location of the forensic artifact, directory location of the forensic artifact, memory location of the forensic artifact, name of the forensic artifact or other information to allow a forensic interpreter to access the forensic artifact.

Based on the forensic artifact filter output, the real-time forensic interpreter applies a forensic analysis to the forensic artifact to generate a result and collects additional forensic metadata associated with the forensic artifact. According to one embodiment, the forensic interpreter parses the forensic artifact filter output to determine the type of forensic artifact changed by the event (step 404) and executes a code library for the type of forensic artifact (step 406) to analyze the forensic artifact and collect additional forensic metadata, such as a user identifier correlating to the change to the forensic artifact. For example, if the forensic interpreter determines that the forensic artifact is a ShellBag, the forensic interpreter executes a code library for performing a forensic analysis of ShellBags. Such code may, for example, be executable to parse the ShellBag artifact to determine the folder browsed, reconstruct the folder path using forensic best practices and parse the time stamp to determine the date and time a folder browsing activity occurred. The code may also be executable to collect a username associated with the registry section in which a ShellBag artifact appears.

The forensic interpreter uses the results of the forensic analysis of the forensic artifact and the additional collected forensic metadata to generate a forensically interpreted activity (step 408). According to one embodiment, the forensically interpreted activity includes a human-understandable description of an activity, the user who carried out the activity and the time that the activity was carried out. The forensically interpreted activity 124 is stored in a digital forensics store for the target computer (step 410). In some embodiments, the forensic artifact is also stored, for example, in association with the forensically interpreted activity 124 created based on the artifact.

FIG. 4 is provided by way of example and not limitation. Various steps may be repeated. For example, steps 402-410 may be repeated for each event that is determined to represent a change to a forensic artifact, until monitoring ends. Steps may be performed in different orders, steps omitted, and additional or alternative steps performed.

Figure 5:
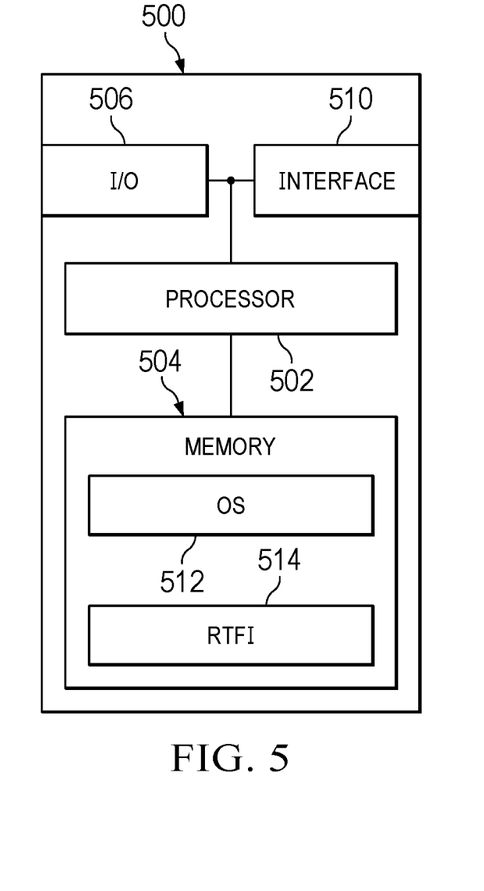
FIG. 5 is a diagrammatic representation of one embodiment of a target computer.

Embodiments of the technology may be implemented on a computing system. Any combination of mobile desktop, server, embedded or other types of hardware may be used. FIG. 5 is a diagrammatic representation of one embodiment of a target computer system 500. Target computer system 500 includes a computer processor 502 and associated memory 504. Computer processor 502 may be an integrated circuit for processing instructions. For example, processor 502 may comprise one or more cores or micro-cores of a processor. Memory 504 may include volatile memory, non-volatile memory, semi-volatile memory or a combination thereof. Memory 504, for example, may include RAM, ROM, flash memory, a hard disk drive, a solid-state drive, an optical storage medium (e.g., CD-ROM), or other computer readable memory or combination thereof. Memory 504 may implement a storage hierarchy that includes cache memory, primary memory or secondary memory. In some embodiments, memory 504 includes storage space on a data storage array. Target computer system 500 also includes input/output ("I/O") devices 506, such as a keyboard, monitor, printer, electronic pointing device (e.g., mouse, trackball, stylus, etc.), or the like. Target computer system 500 also includes a communication interface 510, such as a network interface card, to interface with a network.

Memory 504 includes instructions executable by processor 502. For example, memory 504 may include computer-readable instructions for an operating system 512 that provides a notification interface. Further, memory 504 can include computer-readable instructions executable to implement real-time forensic instrumentation 514, such as real-time forensic instrumentation 100, 210. A portion of memory 504 may be used as a digital forensics data store.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer program product comprising a non-transitory computer-readable medium storing a set of computer-readable instructions, the set of computer-readable instructions comprising instructions executable on a computer that has an operating system with a notification interface to:
   use a monitoring hook into the notification interface of the operating system to receive an event;
   provide a forensic artifact filter coupled to the monitoring hook, the forensic artifact filter comprising code executable to:
      for the event received using the monitoring hook, evaluate the event according to a forensic artifact definition to determine if the event represents a change to a forensic artifact, wherein evaluating the event according to the forensic artifact definition to determine if the event represents the change to the forensic artifact comprises determining that a registry path included in the event corresponds to a ShellBag artifact; and
      based on a determination that the event represents the change to the forensic artifact, output a forensic artifact filter output that includes event information for the event, the event information including an indication of the forensic artifact;
   based on the forensic artifact filter output, collect, at the computer, forensic metadata associated with the forensic artifact but not included in the forensic artifact filter output and apply a forensic analysis to the forensic artifact to generate a result that indicates a first activity with respect to the forensic artifact, the forensic metadata including a user identifier for a user of the operating system who carried out the first activity, wherein applying the forensic analysis to the forensic artifact comprises parsing the ShellBag artifact to determine a folder browsed and reconstructing a folder path for the folder browsed;
   generate in real-time, at the computer, a forensically interpreted activity for the event, the forensically interpreted activity comprising a human-understandable description of the folder path for the folder browsed, the first activity and the user who carried out the first activity with respect to the forensic artifact; and
   store the forensically interpreted activity in a digital forensics store for the computer.

2. The computer program product of claim 1, wherein the set of computer-readable instructions comprises instructions executable to implement a filter driver, the filter driver comprising the forensic artifact filter.

3. The computer program product of claim 1, wherein the set of computer-readable instructions comprises:
   a set of code libraries, each code library in the set of code libraries corresponding to a different type of forensic artifact; and
   code executable to map the event information to a first code library from the set of code libraries, the first code library executable to perform said applying the forensic analysis to the forensic artifact to generate the result, said generating the forensically interpreted activity, and said storing the forensically interpreted activity.

4. The computer program product of claim 1, wherein the set of computer-readable instructions comprises code executable to register a callback with the notification interface of the operating system.

5. The computer program product of claim 4, wherein the set of computer-readable instructions comprises a callback routine for the callback, the callback routine comprising the forensic artifact filter.

6. The computer program product of claim 1, wherein the set of computer-readable instructions comprises instructions executable to:
   set the monitoring hook to receive registry key change notifications, wherein the event specifies a registry key, the registry key located at a registry path location, and wherein evaluating the event according to the forensic artifact definition comprises determining that the event represents the change to the forensic artifact based on the registry path location of the registry key.

7. The computer program product of claim 1, wherein the set of computer-readable instructions comprises instructions executable to:
   set the monitoring hook to receive file change notifications, wherein the event specifies a file, the file located at a file path location, wherein evaluating the event according to the forensic artifact definition comprises determining that the event represents the change to the forensic artifact based on the file path location of the file.

8. The computer program product of claim 1, wherein the set of computer-readable instructions comprises a template activity description and wherein said generating the forensically interpreted activity for the event comprises inserting the forensic metadata and the result into the template activity description.

9. The computer program product of claim 1, wherein the forensic artifact filter outputs the forensic artifact filter output as an out-of-band output.

10. The computer program product of claim 1, wherein the change to the forensic artifact comprises at least one of a creation of the forensic artifact, an update to the forensic artifact or a deletion of the forensic artifact.

11. A method for real-time digital forensic instrumentation comprising:
   on a computer comprising a processor and an operating system with a notification interface, using a monitoring hook into the notification interface of the operating system to receive an event;
   the processor applying a forensic artifact filter to the event, wherein applying the forensic artifact filter comprises:
      evaluating the event according to a forensic artifact definition to determine if the event represents a change to a forensic artifact, including determining that a registry path included in the event corresponds to a ShellBag artifact; and
      based on a determination that the event represents the change to the forensic artifact, generating a forensic artifact filter output that includes event information for the event, the event information including an indication of the forensic artifact; and
   based on the forensic artifact filter output, the processor collecting forensic metadata associated with the forensic artifact but not included in the forensic artifact filter output and applying a forensic analysis to the forensic artifact to generate a result that indicates a first activity with respect to the forensic artifact, the forensic metadata including a user identifier for a user of the computer who carried out the first activity, wherein applying the forensic analysis to the forensic artifact comprises parsing the ShellBag artifact to determine a folder browsed and reconstructing a folder path for the folder browsed;
   the processor generating, in real-time, a forensically interpreted activity for the event, the forensically interpreted activity comprising a human-understandable description of the folder path for the folder browsed, the first activity, and the user who carried out the first activity; and
   the processor storing the forensically interpreted activity in a digital forensics store for the computer.

12. The method of claim 11, wherein set of computer-readable instructions comprises instructions executable to implement a filter driver, the filter driver comprising the forensic artifact filter.

13. The method of claim 11, further comprising:
   providing a set of code libraries, each code library in the set of code libraries corresponding to a different type of forensic artifact; and
   the processor mapping the event information to a first code library from the set of code libraries and executing the first code library to perform said applying the forensic analysis to the forensic artifact to generate the result, said generating the forensically interpreted activity and storing the forensically interpreted activity.

14. The method of claim 11, comprising registering a callback with the notification interface of the operating system.

15. The method of claim 14, comprising providing a callback routine for the callback, the callback routine comprising the forensic artifact filter.

16. The method of claim 11, wherein:
   receiving the event using the monitoring hook comprises receiving a registry key change notification for a registry key at a registry path location; and
   evaluating the event according to the forensic artifact definition comprises determining that the registry key is the forensic artifact based on the registry path location of the registry key.

17. The method of claim 11, wherein generating the forensically interpreted activity for the event comprises inserting the forensic metadata and the result into a template activity description.

18. The method of claim 11, wherein the change to the forensic artifact comprises at least one of a creation of the forensic artifact, an update to the forensic artifact or a deletion of the forensic artifact.

19. A system comprising:
   a processor;
   a computer-readable medium storing an operating system having a notification interface and a set of computer-readable instructions, the set of computer-readable instructions executable to configure the processor with real-time forensic instrumentation, the real-time forensic instrumentation comprising:
a monitoring hook into the notification interface of the operating system to receive an event;
a forensic artifact filter coupled to the monitoring hook, the forensic artifact filter comprising code executable to:
for the event received using the monitoring hook, evaluate the event according to a forensic artifact definition to determine if the event represents a change to a forensic artifact, wherein evaluating the event according to the forensic artifact definition to determine if the event represents the change to the forensic artifact comprises determining that a registry path included in the event corresponds to a ShellBag artifact; and
based on a determination that the event represents the change to the forensic artifact, generate a forensic artifact filter output that includes event information for the event, the event information including an indication of the forensic artifact; and
a forensic interpreter subsystem coupled to the forensic artifact filter, the forensic interpreter subsystem comprising code executable to:
based on the forensic artifact filter output, collect forensic metadata associated with the forensic artifact but not included in the forensic artifact filter output and apply a forensic analysis to the forensic artifact to generate a result that indicates a first activity with respect to the forensic artifact, the forensic metadata including a user identifier for a user of the operating system who carried out the first activity, wherein applying the forensic analysis to the forensic artifact comprises parsing the ShellBag artifact to determine a folder browsed and reconstructing a folder path for the folder browsed;
generate a forensically interpreted activity for the event, the forensically interpreted activity comprising a human-understandable description of the folder path for the folder browsed, the first activity, and the user who carried out the first activity; and
store the forensically interpreted activity in a digital forensics store.

20. The method of claim 11, wherein receiving the event using the monitoring hook comprises receiving a file change notification, wherein the event specifies a file, and wherein evaluating the event according to the forensic artifact definition comprises determining that the event represents the change to the forensic artifact based on a file path location of the file.

21. The system of claim 19, wherein the set of computer-readable instructions comprises:
a set of code libraries, each code library in the set of code libraries corresponding to a different type of forensic artifact; and
code executable to map the event information to a first code library from the set of code libraries, the first code library executable to perform said applying the forensic analysis to the forensic artifact to generate the result, said generating the forensically interpreted activity, and said storing the forensically interpreted activity.

22. The system of claim 19, wherein the set of computer-readable instructions comprises:
a callback routine, wherein the callback routine comprises the forensic artifact filter; and
code executable to register a callback for the callback routine with the notification interface of the operating system.

23. The system of claim 19, wherein the set of computer-readable instructions comprises instructions executable to:
set the monitoring hook to receive registry key change notifications, wherein the event specifies a registry key, the registry key located at a registry path location, and wherein evaluating the event according to the forensic artifact definition comprises determining that the event represents the change to the forensic artifact based on the registry path location of the registry key.

* * * * *